(12) United States Patent
Sattler et al.

(10) Patent No.: US 7,823,124 B2
(45) Date of Patent: *Oct. 26, 2010

(54) TRANSFORMATION LAYER

(75) Inventors: Juergen Sattler, Wiesloch (DE); Joachim Gaffga, Wiesloch (DE); Werner Wolf, Wiesloch (DE); Robert Viehmann, Waghausl (DE); Frank Markert, Grossostheim (DE)

(73) Assignee: SAP AG, Walldorf (DE)

( * ) Notice: Subject to any disclaimer, the term of this patent is extended or adjusted under 35 U.S.C. 154(b) by 1031 days.

This patent is subject to a terminal disclaimer.

(21) Appl. No.: 11/512,608

(22) Filed: Aug. 29, 2006

(65) Prior Publication Data

US 2008/0127123 A1 May 29, 2008

(51) Int. Cl.
G06F 9/44 (2006.01)

(52) U.S. Cl. ............... 717/117; 717/110; 717/121; 717/169; 706/46; 706/47

(58) Field of Classification Search ............... 717/117, 717/168, 169, 173, 121; 706/11, 45, 47, 706/46; 710/11; 715/700; 714/38; 713/1
See application file for complete search history.

(56) References Cited

U.S. PATENT DOCUMENTS

| | | | |
|---|---|---|---|
| 4,079,452 A * | 3/1978 | Larson et al. ............... 710/11 |
| 4,501,528 A | 2/1985 | Knapp | |
| 5,307,499 A | 4/1994 | Yin | |
| 5,459,868 A | 10/1995 | Fong | |
| 5,680,624 A | 10/1997 | Ross | |
| 5,754,845 A | 5/1998 | White | |
| 5,758,062 A * | 5/1998 | McMahon et al. ............ 714/38 |
| 5,857,102 A | 1/1999 | McChesney et al. | |
| 5,978,579 A | 11/1999 | Buxton et al. | |
| 6,044,461 A * | 3/2000 | Agha et al. ............... 713/1 |
| 6,067,525 A | 5/2000 | Johnson et al. | |
| 6,128,730 A | 10/2000 | Levine | |
| 6,161,123 A | 12/2000 | Renouard et al. | |
| 6,161,176 A | 12/2000 | Hunter et al. | |
| 6,185,587 B1 | 2/2001 | Bernardo et al. | |
| 6,189,139 B1 | 2/2001 | Ladd | |
| 6,301,710 B1 | 10/2001 | Fujiwara | |

(Continued)

FOREIGN PATENT DOCUMENTS

JP 2004287972 A 10/2004

(Continued)

OTHER PUBLICATIONS

Title: Critical configurations for n-view projective reconstruction, author: Kahl et al, source: IEEE, dated: Dec. 14, 2001.*

(Continued)

*Primary Examiner*—Chameli C Das
(74) *Attorney, Agent, or Firm*—Schwegman, Lundberg & Woessner, P.A.

(57) ABSTRACT

The present subject mater relates to configuration of software applications and, more particularly, a configuration transformation layer. The various embodiments described herein provide systems, methods, and software to instantiate a multilayer application, wherein each application layer includes configuration settings and executing a transformation engine to transform configuration settings between application layers as a function of one or more transformation schemas.

11 Claims, 11 Drawing Sheets

U.S. PATENT DOCUMENTS

| | | |
|---|---|---|
| 6,324,578 B1 | 11/2001 | Cox et al. |
| 6,397,232 B1 | 5/2002 | Cheng-Hung et al. |
| 6,449,624 B1 | 9/2002 | Hammack et al. |
| 6,453,302 B1 | 9/2002 | Johnson et al. |
| 6,466,972 B1 | 10/2002 | Paul et al. |
| 6,470,464 B2 | 10/2002 | Bertram et al. |
| 6,513,045 B1 | 1/2003 | Casey et al. |
| 6,523,027 B1 | 2/2003 | Underwood |
| 6,538,668 B1* | 3/2003 | Ruberg et al. ............... 715/747 |
| 6,539,372 B1 | 3/2003 | Casey et al. |
| 6,728,877 B2 | 4/2004 | Mackin et al. |
| 6,804,709 B2 | 10/2004 | Manjure et al. |
| 6,810,401 B1 | 10/2004 | Thompson et al. |
| 6,868,392 B1 | 3/2005 | Ogasawara |
| 7,031,951 B2 | 4/2006 | Mancisidor et al. |
| 7,032,114 B1* | 4/2006 | Moran ........................ 713/187 |
| 7,062,502 B1* | 6/2006 | Kesler ................ 1/1 |
| 7,181,731 B2 | 2/2007 | Pace et al. |
| 7,228,326 B2 | 6/2007 | Srinivasan et al. |
| 7,299,382 B2 | 11/2007 | Jorapur |
| 7,337,317 B2* | 2/2008 | Meggitt et al. ............... 713/164 |
| 7,340,411 B2 | 3/2008 | Cook |
| 7,360,211 B2* | 4/2008 | Hyden et al. ................ 717/174 |
| 7,376,682 B2 | 5/2008 | Ramacher et al. |
| 7,379,455 B2* | 5/2008 | Pickett ........................ 370/389 |
| 7,426,694 B2* | 9/2008 | Gross et al. ................ 715/762 |
| 7,487,231 B2 | 2/2009 | Brown et al. |
| 7,526,457 B2* | 4/2009 | Duevel et al. ................ 706/11 |
| 7,540,014 B2* | 5/2009 | Vasishth et al. ................ 726/1 |
| 7,593,124 B1* | 9/2009 | Sheng et al. ............... 358/1.15 |
| 7,599,895 B2* | 10/2009 | Nugent ........................ 706/14 |
| 7,606,840 B2 | 10/2009 | Malik |
| 7,610,582 B2 | 10/2009 | Becker et al. |
| 7,617,256 B2 | 11/2009 | Mohamed et al. |
| 7,640,542 B2 | 12/2009 | Herenyi et al. |
| 7,644,432 B2* | 1/2010 | Patrick et al. ................ 726/1 |
| 7,657,887 B2 | 2/2010 | Kothandraman et al. |
| 7,665,082 B2 | 2/2010 | Wyatt et al. |
| 7,685,577 B2 | 3/2010 | Pace et al. |
| 7,716,634 B2* | 5/2010 | Ross et al. ................ 717/106 |
| 7,725,877 B2 | 5/2010 | Andrade et al. |
| 7,739,657 B2* | 6/2010 | Rolfs ........................ 717/106 |
| 2001/0044834 A1 | 11/2001 | Bradshaw et al. |
| 2001/0054091 A1 | 12/2001 | Lenz et al. |
| 2002/0026572 A1 | 2/2002 | Joory |
| 2002/0095663 A1 | 7/2002 | Joory |
| 2002/0099578 A1 | 7/2002 | Eicher et al. |
| 2002/0116373 A1 | 8/2002 | Nishikawa et al. |
| 2002/0138570 A1 | 9/2002 | Hickey |
| 2002/0147784 A1 | 10/2002 | Gold et al. |
| 2002/0188625 A1 | 12/2002 | Jans et al. |
| 2003/0005411 A1 | 1/2003 | Gerken |
| 2003/0023963 A1* | 1/2003 | Birkholz et al. ............. 717/172 |
| 2003/0115292 A1 | 6/2003 | Griffin et al. |
| 2003/0135842 A1 | 7/2003 | Frey et al. |
| 2003/0227392 A1 | 12/2003 | Ebert et al. |
| 2003/0237093 A1 | 12/2003 | Marsh et al. |
| 2004/0019669 A1 | 1/2004 | Viswanath et al. |
| 2004/0019670 A1 | 1/2004 | Viswanath et al. |
| 2004/0031030 A1* | 2/2004 | Kidder et al. ............... 717/172 |
| 2004/0060047 A1 | 3/2004 | Talati et al. |
| 2004/0088691 A1 | 5/2004 | Hammes et al. |
| 2004/0111417 A1 | 6/2004 | Goto et al. |
| 2004/0176996 A1 | 9/2004 | Powers et al. |
| 2004/0186927 A1 | 9/2004 | Eryurek et al. |
| 2004/0268342 A1* | 12/2004 | Hyden et al. ................ 717/174 |
| 2005/0007964 A1* | 1/2005 | Falco et al. ................ 370/256 |
| 2005/0044215 A1 | 2/2005 | Cohen et al. |
| 2005/0044546 A1 | 2/2005 | Niebling et al. |
| 2005/0080801 A1 | 4/2005 | Kothandaraman et al. |
| 2005/0086195 A1 | 4/2005 | Tan et al. |
| 2005/0108219 A1 | 5/2005 | De La Huerga |
| 2005/0108707 A1 | 5/2005 | Taylor et al. |
| 2005/0138558 A1* | 6/2005 | Duevel et al. ............... 715/700 |
| 2005/0160419 A1* | 7/2005 | Alam et al. .................. 717/174 |
| 2005/0188422 A1 | 8/2005 | Jooste |
| 2005/0193103 A1 | 9/2005 | Drabik |
| 2005/0262076 A1 | 11/2005 | Voskuil |
| 2005/0262499 A1 | 11/2005 | Read |
| 2005/0268282 A1 | 12/2005 | Laird |
| 2005/0278202 A1 | 12/2005 | Broomhall et al. |
| 2005/0278280 A1 | 12/2005 | Semerdzhiev et al. |
| 2006/0047793 A1* | 3/2006 | Agrawal et al. ............. 709/221 |
| 2006/0184917 A1 | 8/2006 | Troan et al. |
| 2006/0224637 A1 | 10/2006 | Wald |
| 2006/0234698 A1* | 10/2006 | Fok et al. ..................... 455/425 |
| 2006/0248450 A1 | 11/2006 | Wittenberg et al. |
| 2006/0253588 A1 | 11/2006 | Gao et al. |
| 2007/0006161 A1 | 1/2007 | Kuester et al. |
| 2007/0025704 A1 | 2/2007 | Tsukazaki et al. |
| 2007/0074203 A1 | 3/2007 | Curtis et al. |
| 2007/0093926 A1 | 4/2007 | D. Braun et al. |
| 2007/0097975 A1 | 5/2007 | Rakers et al. |
| 2007/0157185 A1* | 7/2007 | Semerdzhiev et al. ........ 717/148 |
| 2007/0157192 A1 | 7/2007 | Hoefler et al. |
| 2007/0168065 A1 | 7/2007 | Nixon et al. |
| 2007/0198437 A1 | 8/2007 | Eisner et al. |
| 2007/0234274 A1* | 10/2007 | Ross et al. .................. 717/101 |
| 2007/0257715 A1 | 11/2007 | Semerdzhiev et al. |
| 2008/0059474 A1 | 3/2008 | Lim |
| 2008/0059490 A1 | 3/2008 | Sattler et al. |
| 2008/0059537 A1 | 3/2008 | Sattler et al. |
| 2008/0059630 A1 | 3/2008 | Sattler et al. |
| 2008/0071555 A1 | 3/2008 | Sattler et al. |
| 2008/0071718 A1 | 3/2008 | Sattler et al. |
| 2008/0071828 A1 | 3/2008 | Sattler et al. |
| 2008/0071839 A1 | 3/2008 | Sattler et al. |
| 2008/0082517 A1 | 4/2008 | Sattler et al. |
| 2008/0126375 A1 | 5/2008 | Sattler et al. |
| 2008/0126448 A1 | 5/2008 | Sattler et al. |
| 2008/0127082 A1 | 5/2008 | Birimisa et al. |
| 2008/0127084 A1 | 5/2008 | Sattler et al. |
| 2008/0127085 A1 | 5/2008 | Sattler et al. |
| 2008/0127086 A1 | 5/2008 | Sattler et al. |
| 2008/0195579 A1 | 8/2008 | Kennis et al. |
| 2009/0024990 A1 | 1/2009 | Singh et al. |
| 2009/0157455 A1 | 6/2009 | Kuo et al. |
| 2010/0082518 A1 | 4/2010 | Gaffga et al. |
| 2010/0153443 A1 | 6/2010 | Gaffga et al. |
| 2010/0153468 A1 | 6/2010 | Lange et al. |

FOREIGN PATENT DOCUMENTS

| | | | |
|---|---|---|---|
| WO | WO-2004114130 A2 | 12/2004 | |
| WO | WO-2005045670 A1 | 5/2005 | |

OTHER PUBLICATIONS

A Rule-based Approach to Content Delivery Adaptation in Web Information Systems, dated: May 12, 2006, author: Virgilo et al, source: IEEE.*

"U.S. Appl. No. 11/512,442, Non Final Office Action mailed Oct. 1, 2009", 15 pgs.

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Non Final Office Action mailed Apr. 27, 2009", 15 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Sep. 22, 2009 to Final Office Action mailed Jun. 24, 2009", 10 pgs.

"U.S. Appl. No. 11/512,517, Response to Non-Final Office Action mailed Jan. 29, 2009", 16 pgs.

"U.S. Appl. No. 11/512,609, Final Office Action mailed Dec. 8, 2008", 12 pgs.

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"U.S. Appl. No. 11/512,443, Response filed Oct. 9, 2008 to Non-Final Office Action mailed Jul. 9, 2008", 11 pgs.

"U.S. Appl. No. 11/512,443, Non-Final Office Action mailed Jul. 9, 2008", 17 pgs.

"U.S. Appl. No. 11/512,517, Non-Final Office Action mailed Oct. 29, 2008", 13 pgs.

"U.S. Appl. No. 11/512,519 response filed Nov. 11, 2008 to Non-Final Office Action mailed Sep. 11, 2008", 15 pgs.

"U.S. Appl. No. 11/512,519, Non-FinalOffice Action mailed Sep. 11, 2008", 14 pgs.

"U.S. Appl. No. 11/512,609, Non Final Office Action mailed on Jun. 19, 2008", 9 pgs.

"U.S. Appl. No. 11/512,609, Response filed Sep. 19, 2008 to Non-Final Office Action mailed Jun. 19, 2008", 8 pgs.

"U.S. Appl. No. 11/512,884, Non-Final Office Action Mailed Jul. 29, 2008", 12 pgs.

"U.S. Appl. No. 11/512,884, Response filed Sep. 23, 2008 to Non-Final Office Action mailed Jul. 29, 2008", 17 pgs.

Liu, et al., "A Knowledge-Based Approach to Requirements Analysis", (1995).

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Written Opinion Mailed Mar. 17, 2008", 8 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007462, Partial International Search Report Dec. 27, 2007", 8 pgs.

"International Application Serial No. PCT/EP2007/007490, International Search Report Oct. 26, 2007", 4 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

Indigorose, "Setup Factory", *User's Guide IndigoRose Software Design No. 2*, (Mar. 1998), 82 pgs.

"U.S. Appl. No. 11/511,357 Non-Final Office Action mailed Jul. 2, 2010", 11 pgs.

"U.S. Appl. No. 11/512,440, Non-Final Office Action mailed Jun. 17, 2010", 14 pgs.

"U.S. Appl. No. 11/512,441, Non-Final Office Action mailed Jun. 21, 2010", 8 pgs.

"U.S. Appl. No. 11/512,442, Final Office Action mailed Apr. 21, 2010", 13 pgs.

"U.S. Appl. No. 11/512,442, Response filed Jan. 4, 2010 to Non Final Office Action mailed Oct. 1, 2009", 10 pgs.

"U.S. Appl. No. 11/512,442, Response filed Jun. 21, 2010 to Final Office Action mailed Apr. 21, 2010", 9 pgs.

"U.S. Appl. No. 11/512,443, Final Office Action mailed Jan. 22, 2010", 14 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,457, Response filed Aug. 5, 2010 to Non Final Office Action mailed May 13, 2010", 10 pgs.

"U.S. Appl. No. 11/512,516 Non-Final Office Action mailed Jul. 8, 2010", 20 pgs.

"U.S. Appl. No. 11/512,516, Final Office Action mailed Mar. 5, 2010", 16 pgs.

"U.S. Appl. No. 11/512,516, Response filed Apr. 30, 2010 to Final Office Action mailed Mar. 5, 2010", 9 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,517, Response filed Dec. 14, 2009 to Non Final Office Action mailed Sep. 16, 2009", 8 pgs.

"U.S. Appl. No. 11/512,518, Non-Final Office Action mailed May 27, 2010", 14 pgs.

"U.S. Appl. No. 11/512,520, Notice of Allowance mailed Jan. 25, 2010", 6 pgs.

"U.S. Appl. No. 11/512,520, Notice of Allowance mailed Jun. 15, 2010", 6 pgs.

"U.S. Appl. No. 11/512,609, Final Office Action mailed Nov. 20, 2009", 15 pgs.

"U.S. Appl. No. 11/512,886, Notice of Allowance mailed Dec. 24, 2009", 8 pgs.

"European Application Serial No. 09012347.2, Extended European Search Report mailed Nov. 26, 2009", 5 pgs.

Bellissard, Luc, et al., "Component-based Programming and Application Management with Olan, Proceedings of Workshop on Distributed Computing", Retrieved on [Jun. 15, 2010] Retrieved from the Internet: URL<http://www.springerlink.com/contenUf2g8rI4083393124/fulitext.pdf>, (1995).

Hwang, Jeong Hee, et al., "Context Based Recommendation Service in Ubiquitous Commerce", Database Laboratory, Chungbuk National University, Korea, Springer—Verlag Berlin Heidelberg,, (2005).

Krintz, Chandra J., "Reducing load delay to improve performance of Internet-computing programs", University of California, San Diego, (2001), 225 pgs.

"U.S. Appl. No. 11/512,457 Notice of Allowance mailed Aug. 13, 2010", 13 pgs.

"U.S. Appl. No. 11/512,517, Non-Final Office Action mailed Aug. 16, 2010", 30 pgs.

"U.S. Appl. No. 11/512,518, Response filed Aug. 24, 2010 to Non Final Office Action mailed May 27, 2010", 10 pgs.

Dotoli, et al., "A decision support system for the supply chain configuration", IEEE, (Oct. 8, 2003), 6 pgs.

Gu, Mingyang, et al., "Component Retrieval Using Conversational Case-Base Reasoning", IEA/AIE, Annecy, France, (Jun. 27-30,2006), 12 pgs.

Park, Young, "Software retrieval by samples using concept analysis", Journal of Systems and Software 54, (2000), 179-183.

US 7,571,147, 08/2009, Sattler et al. (withdrawn)

* cited by examiner

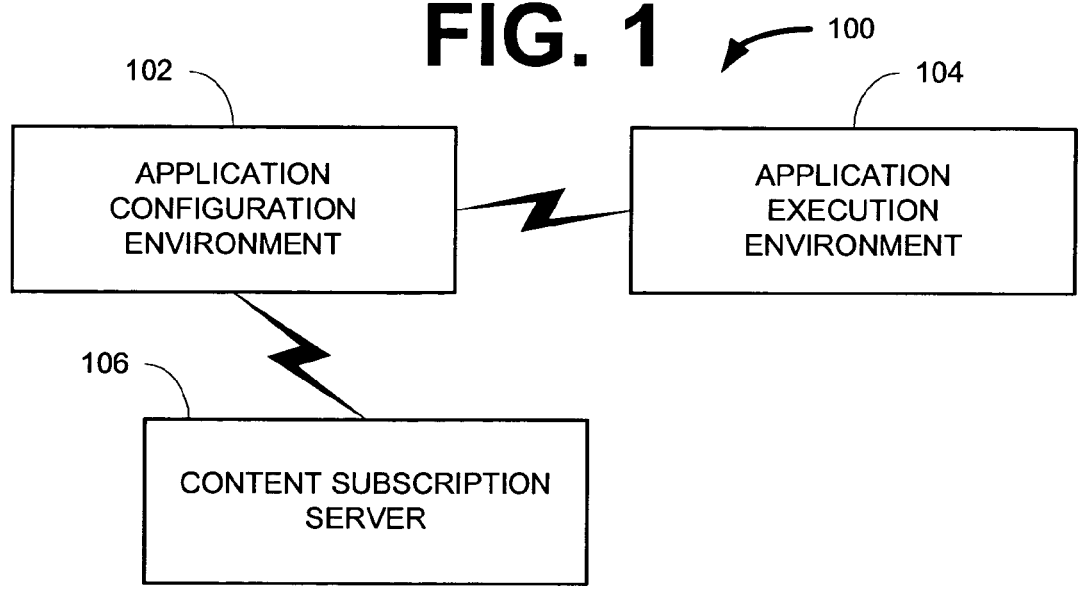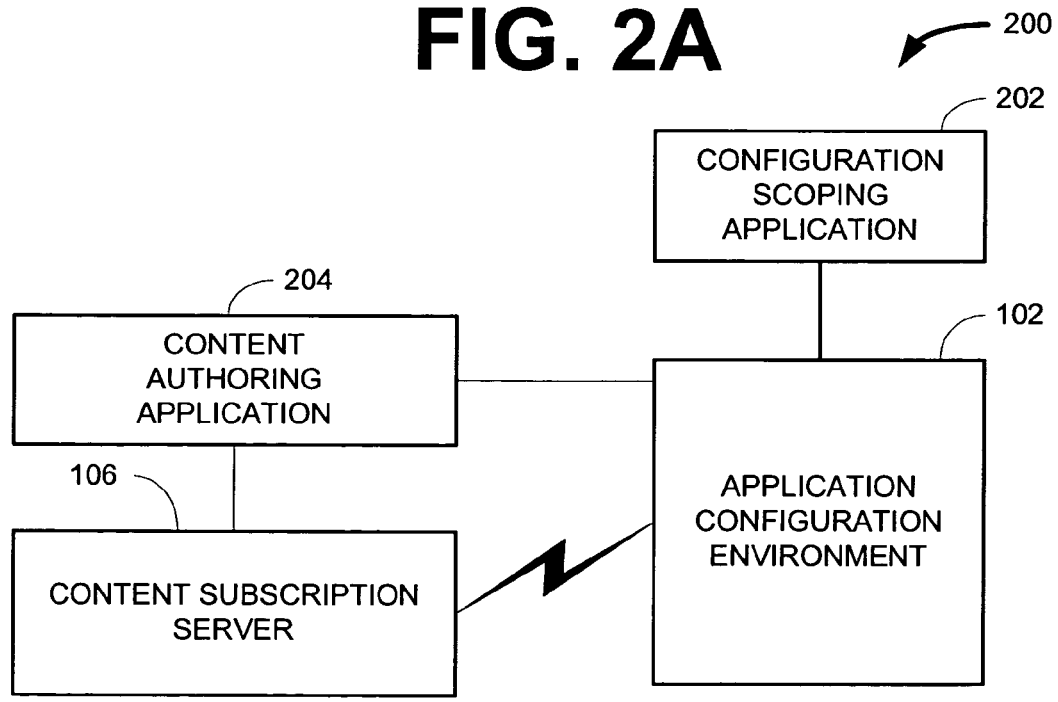

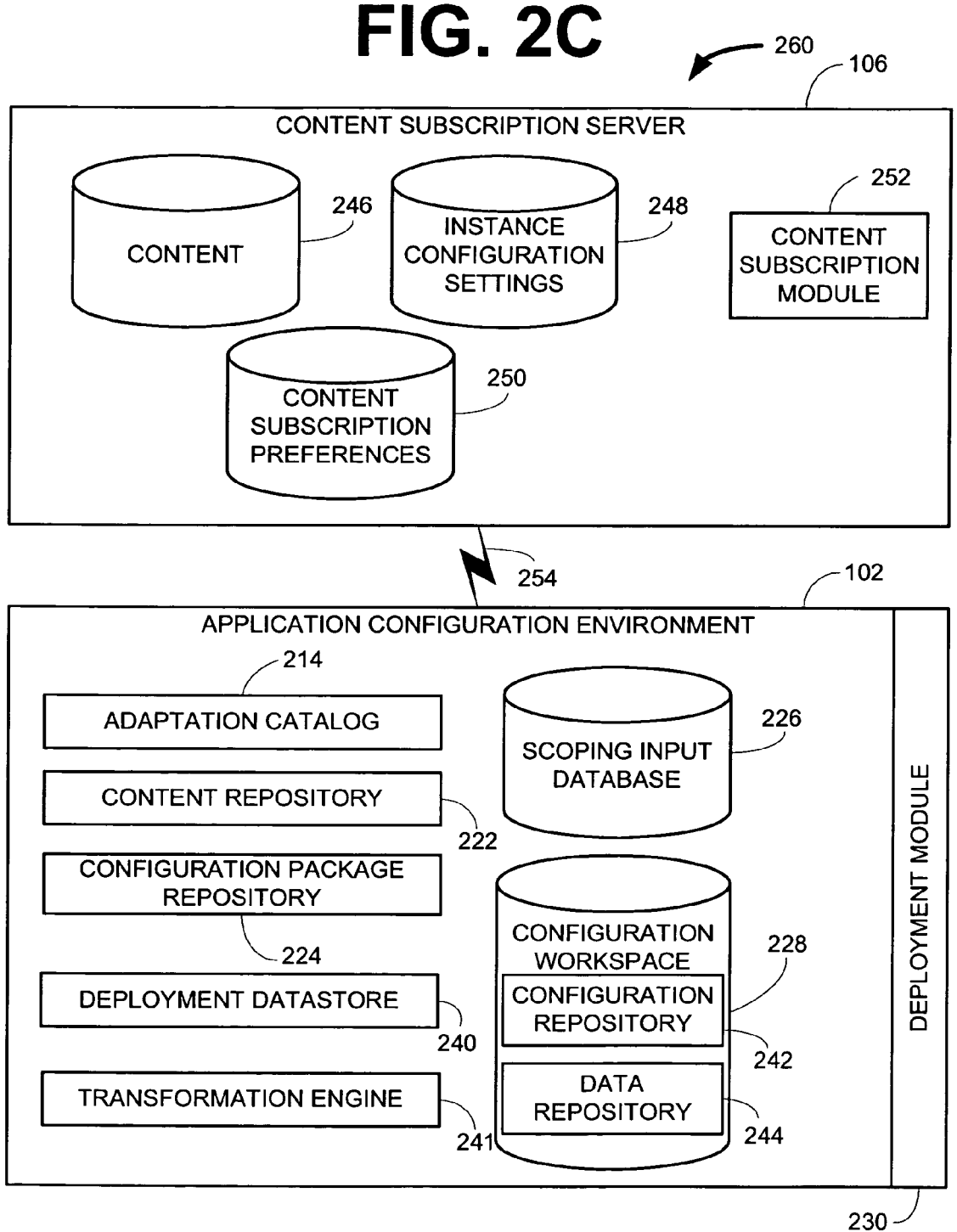

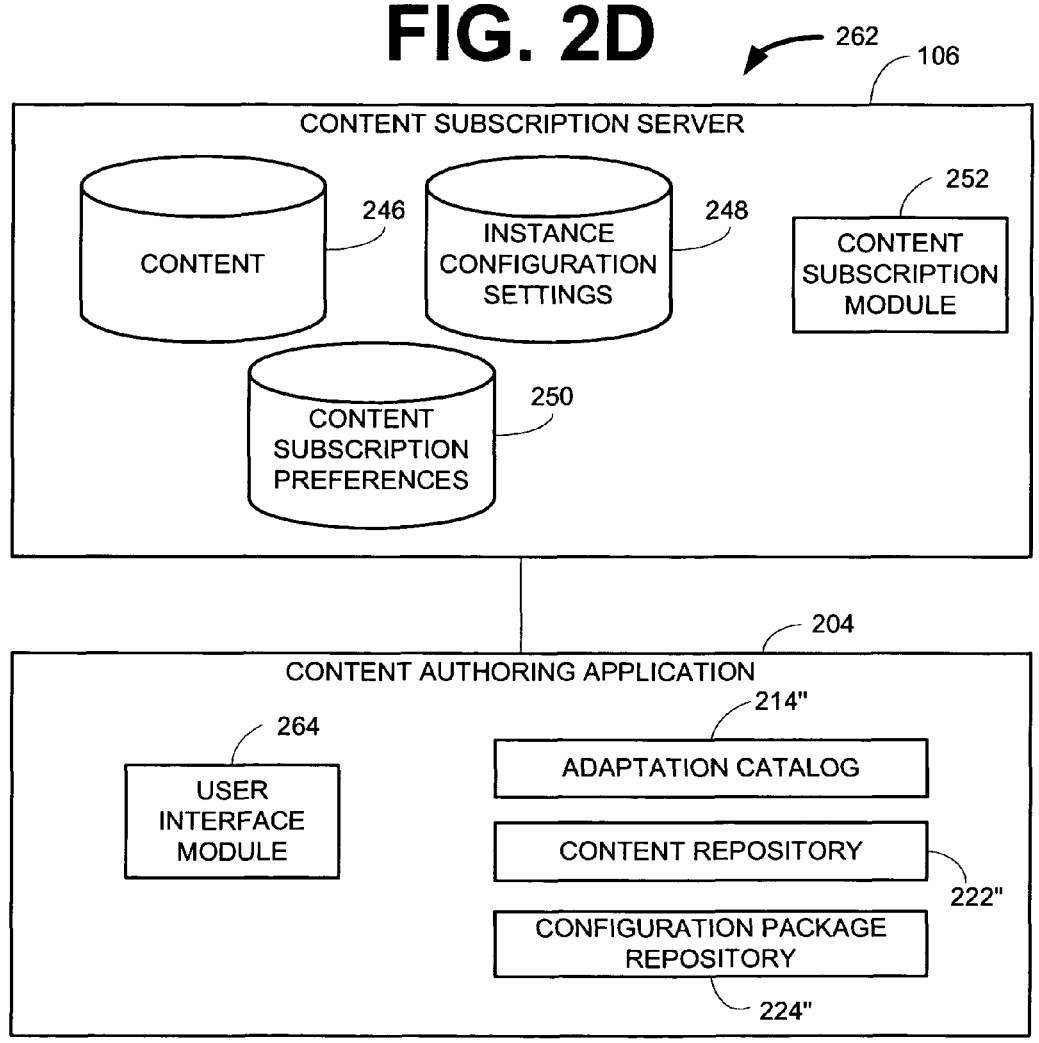

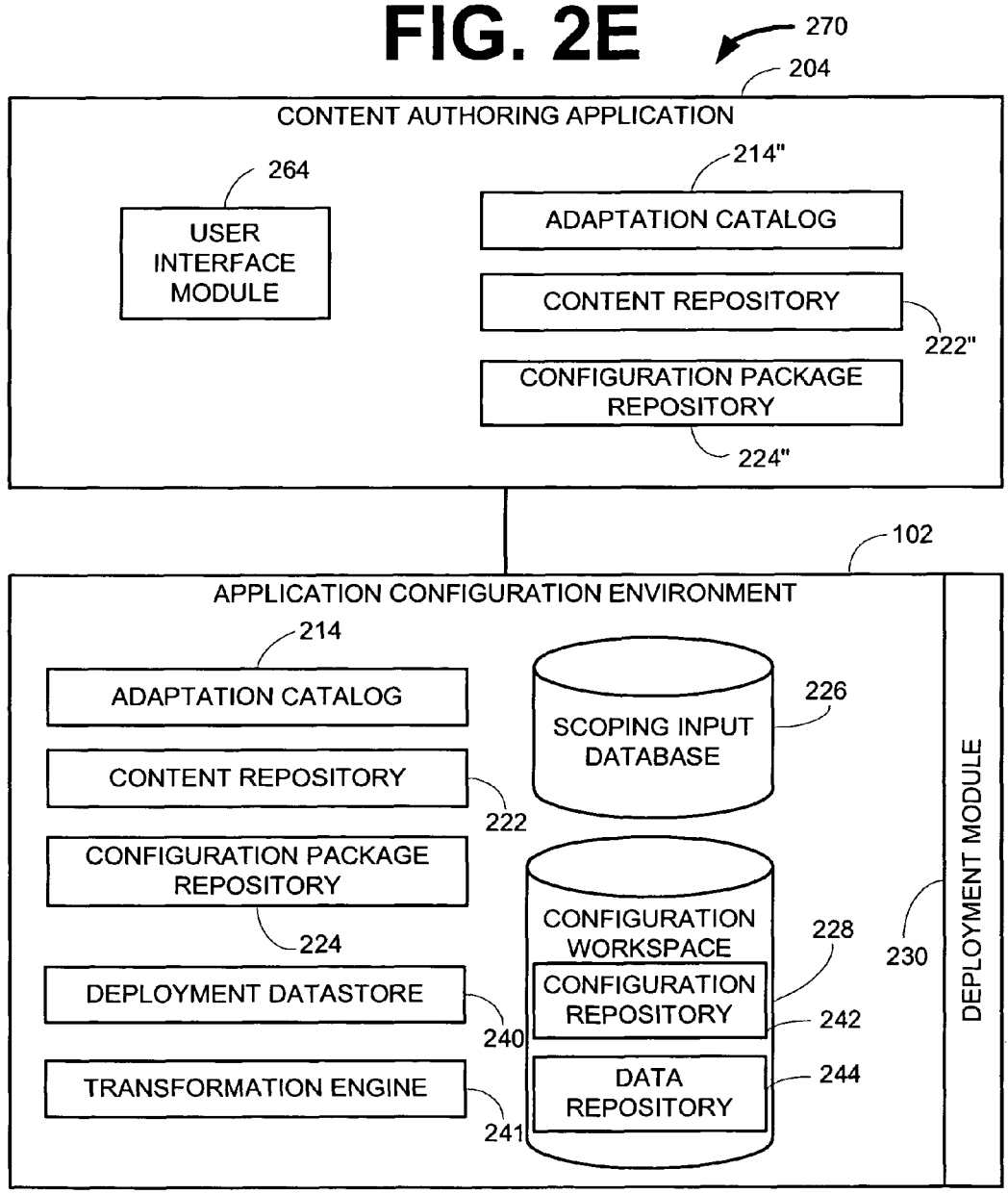

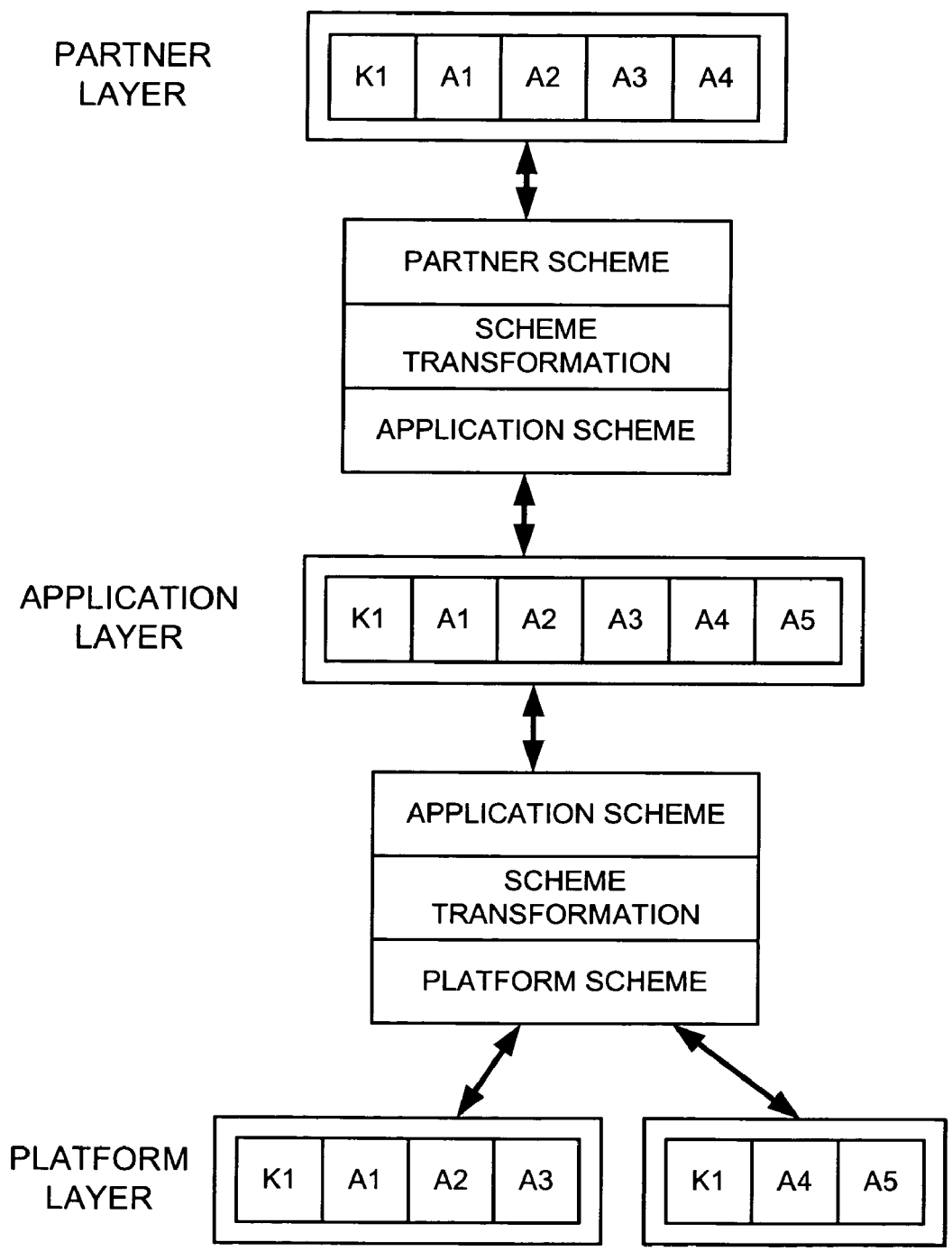

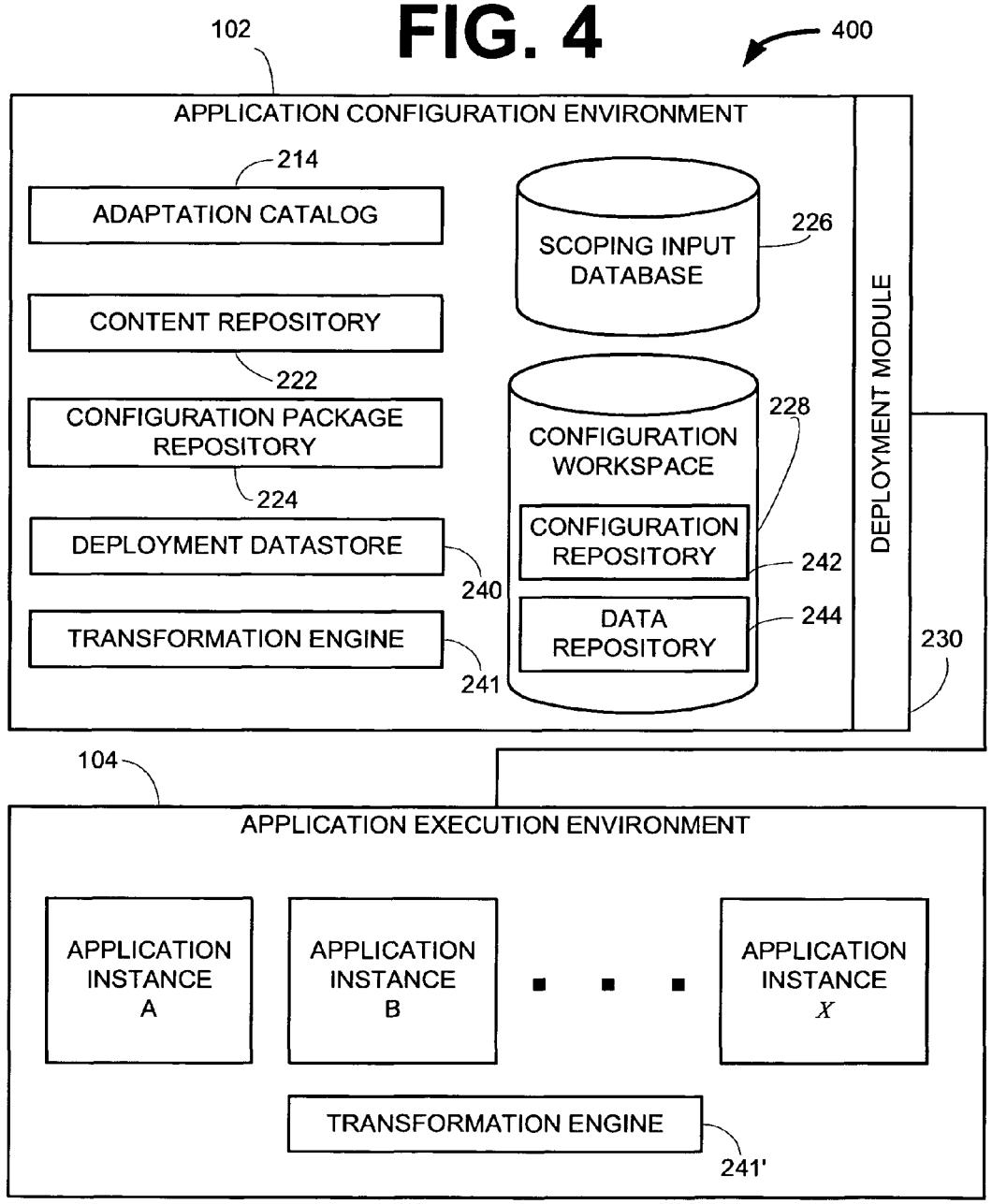

TRANSFORMATION LAYER

TECHNICAL FIELD

The present subject mater relates to configuration of software applications and, more particularly, a configuration transformation layer.

BACKGROUND INFORMATION

Third-party software developers and organizations commonly develop additional content for such software applications, such as enterprise resource planning ("ERP") applications, developed by other organizations. However, the architecture of typical applications commonly make it difficult to develop additional application content in a manner that easily allows distribution of the additional content to other application instances. Further, even if the additional content may be distributed, deployment of the content typically requires modification of application configuration settings. Modifying configuration settings to deploy additional content commonly has adverse effects upon other portions of software applications.

BRIEF DESCRIPTION OF THE DRAWINGS

FIG. 1 is a block diagram of a system according to an example embodiment.

FIG. 2A is a block diagram of a system according to an example embodiment.

FIG. 2C is a block diagram of a system according to an example embodiment.

FIG. 2D is a block diagram of a system according to an example embodiment.

FIG. 2E is a block diagram of a system according to an example embodiment.

FIG. 3B is a block diagram of an application of a transformation schema according to an example embodiment.

FIG. 4 is a block diagram of a system according to an example embodiment.

DETAILED DESCRIPTION

Figure 2B:
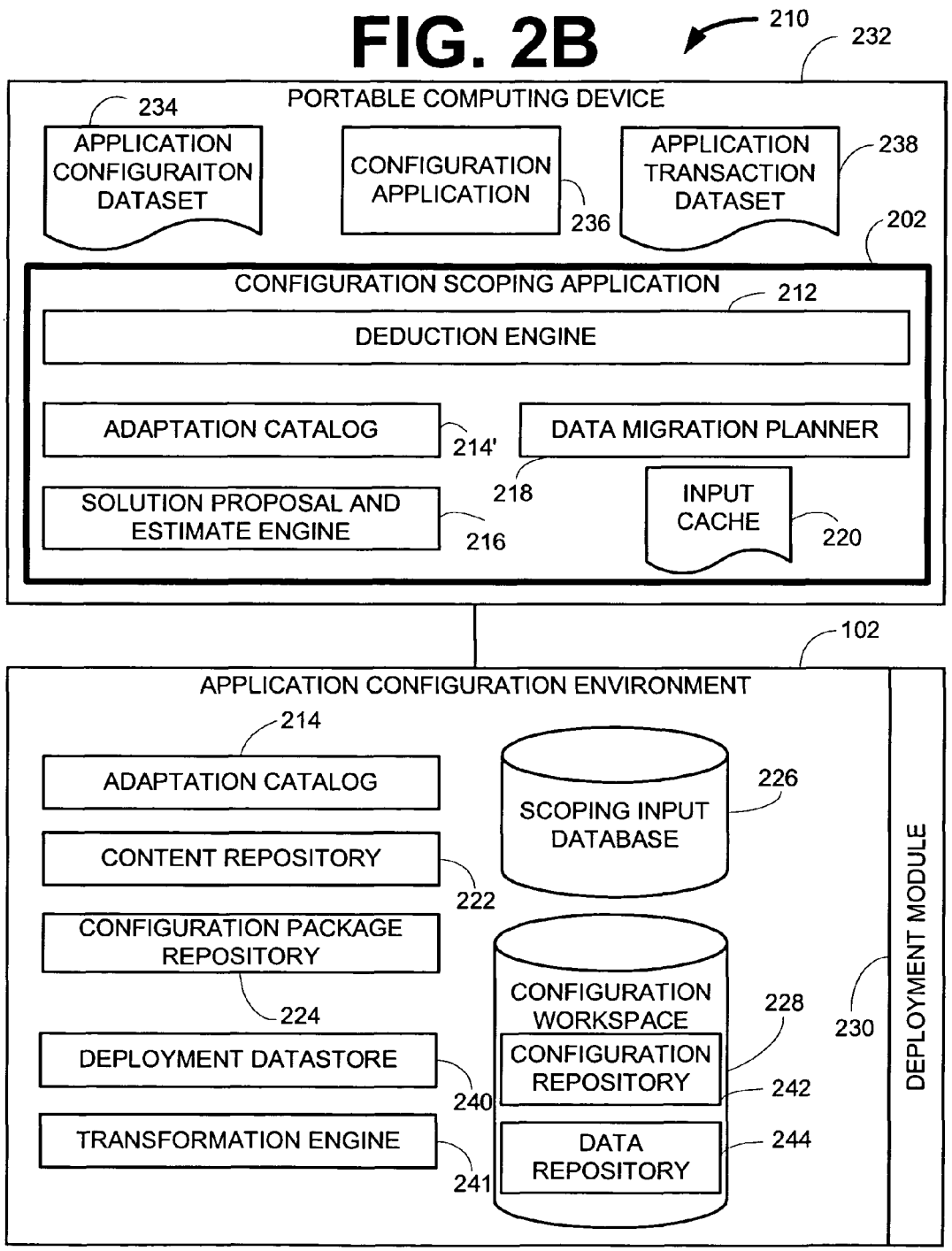
FIG. 2B is a block diagram of a system according to an example embodiment.

The various embodiments described in the present application provide systems, methods, and software that facilitate development and deployment of highly-transportable computer application content developed by application developers, third-party software developers, organizations utilizing the computer application, and others. These embodiments further simplify content upgrades and deployment in various ways.

Some such embodiments provide a layered architecture that may be used for various purposes. One typical purpose is to simply application configuration by modifying an appearance of one or more application configuration settings. Modifying the appearance of configuration settings may be used to prevent modification of one or more configuration settings through masking, simplify application configuration by combining two or more configuration settings that are directly dependent upon one another, or for other purposes.

In some embodiments, each layer of the architecture may include configuration settings. Further, each layer of the architecture may include a transformation schema to link configuration settings of one layer to configuration settings of another layer. A transformation schema links configuration settings between application layers using a set of rules. These rules may be used to define a 1:1 mapping of configuration settings between layers, a conditioned mapping of configuration settings between layers, a merging of configuration settings of one layer to another, filtering configuration settings of one layer to another, separation of configuration attributes in a layer, and other uses.

In some embodiments, the architecture may separate application modifications into layers. Application modifications may include application modifications provided by third-party software developers, commonly referred to as partners. Application modifications also, or alternatively, typically include application modifications performed by organizations utilizing the application. In an example embodiment, modifications provided by a partner are stored in a partner layer and modifications performed by an organization utilizing the application are stored in a customer layer.

Application modifications commonly are packaged as preconfigured application content. A package of preconfigured application content may include configuration settings and other content such as user interfaces. A package of preconfigured application content may be deployed in an application instance to cause the application instance to operate in a certain manner. Packages of preconfigured application content are commonly deployed to a certain layer, depending on the source of the package. For example, a package developed by a partner is commonly deployed to the partner layer. A package from a developer of the application is commonly deployed in an application layer.

These embodiments, and others described in the present application allow for creation and distribution of highly-transportable modifications to applications, such as through the use of predefined application content packages. These embodiments, and others, also may be utilized to simply, or otherwise modify, application configuration.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application may be implemented in hardware, software or a combination of software and hardware in one or more embodiments. The software comprises computer executable instructions stored on computer readable media such as memory or other type of storage devices. The term "computer readable media" is also used to represent carrier waves on which the software is transmitted. Further, such functions correspond to modules, which may be a combination of software, hardware, or firmware. Multiple functions may be performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes an application configuration environment 102, an application execution environment 104, and a content subscription server 106.

The application configuration environment 102 is a system 100 environment within which an application may be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration may then be deployed to the application execution environment 104. This deployment may occur to one or more separate instances of the application in the application execution environment 104. Although only a single application execution environment 104 is illustrated, multiple application execution environments 104 may exist, and the deployment may be made to one or more of the multiple application execution environments 104.

The content subscription server 106 receives content updates and new content from content authors, or through a content authoring process, then publishes the content to the content subscription server 106. When content is published to the content subscription server 106, the content includes metadata identifying what portions of an application the content is relevant to or otherwise has an effect upon. In some embodiments, the metadata identifies a version of an item of content, such as version 2.0 of a previously existing item of content. In such instances, the new version of the content is backward compatible with previous versions of the application instance to ensure that new content does not adversely affect a previously stable application instance.

The content subscription server 106 further includes a database, or has access to a database, including data representative of application instance configurations. In some such embodiments, the data representative of the application instance configurations includes data representative of content deployed to the respective application instances.

The content subscription server 106 further includes a content subscription module that evaluates the metadata of received content updates and new content. As mentioned above, this metadata identifies application portions of the application the content is relevant to or otherwise has an effect upon. The content subscription module may then query the database including the representations of application instance configurations to determine which application instances the new content is relevant to. The new content may then be distributed to the application configuration environments of the identified application instances. The application configuration environment may then deploy the new content.

In some embodiments, the content subscription server 106 further includes a database of content subscription preferences. In some such embodiments, when an application instance is instantiated, an application administrator, or other individual, sets up a content subscription. A content subscription includes a specification of content subscription preferences that are stored in the content subscription preference database. These preferences identify how to handle new content when new content is published to the content subscription server 106.

In some embodiments, the content subscription preferences specify that new content that is identified by the content subscription module to be relevant to the application instance be pushed to the application configuration environment 102 over a network, such as the Internet. In some such embodiments, when new content is pushed to the application configuration environment, a content subscription preference specifies that the new content be automatically deployed to the application execution environment 104 by a deployment process. In other embodiments, the preferences specify that the pushed content is to be stored in an administrator inbox. In these embodiments, the administrator, or other individual will manually instruct the deployment module to deploy the new content. In some other embodiments, a content subscription preference specifies for the new content to be placed in a new content inbox. The new content inbox may be located on the content subscription server 106 or other server from which the new content can be accessed for download.

FIG. 2A is a block diagram of a system 200 according to an example embodiment. The system 200 includes a configuration scoping application 202, the application configuration environment 102, the content authoring application 204, and the content subscription server 106.

The configuration scoping application 202 is typically a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions may be linked to one of many adaptation catalog entries. The adaptation catalog entries may include a representation of all of the solution capabilities of an application to be configured, and eventually executed. In some embodiments, the solution capabilities are hierarchically divided into areas, packages, topics, and options. There may be multiple areas, and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a scoping question, "What is the primary focus of your business?" has three possible answers. These answers include "Sales," "Service," and "Logistics." This first scoping question is typically aimed at identifying an area of business in which the application is going to be used. Answering "Sales" tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. This rule may also specify that other packages, topics, and options and the corresponding solution capabilities be excluded.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration.

In some embodiments, the answers to the scoping questions answers are stored in a location accessible to the content subscription server 106. The storing may include storing the scoping question answers on the content subscription server 106 and the content subscription server 106 being able to access the scoping question answers within the application configuration environment 102.

The answers to the configuration scoping questions may be used by a content subscription module process to identify new content that is relevant to one or more application instances. This may occur in instances such as when the new content includes new functionality not previously linked to a scoping question answer in the adaptation catalog.

The content authoring application 204 provides a set of tools to author content. The set of tools are provided by the content authoring application 204 through one or more user interfaces. The content authoring application 204, in some embodiments, is a standalone application. In other embodiments, the content authoring application 204 executes on a computing device operatively coupled to the content subscription server 106 and one or more application configuration environments 102. In other embodiments, the content authoring application 204 is a portion of a larger application and does not require a connection to the content subscription server 106 or the application environment 102.

Content that may be created, modified, and deleted using the tools of the content authoring application 204 includes adaptation catalog entries, forms, user interfaces, reports, communication specifications, documentation, preconfigured application content packages, and other content that may be used in an application when deployed. In some embodiments, a communication specification includes an XML schema, an EDI schema and connectivity information, mappings between file layouts and application data storage mechanisms, such as databases, or other similar communication specifications.

In some embodiments, content authored utilizing the content authoring application may be authored based on another item of content. This may include extending, or otherwise modifying, an item of content. For example, a user may create a second item of content by inheriting the properties of a first item of content, such as a user interface. The user may then modify the second item of content, such as by making a user interface field invisible and modifying a user interface title header. In some embodiments, when the user saves the second item of content, only a reference to the first item of content and the differences between the first item of content and the second item of content are stored. Thus, when the second item of content is later opened or utilized in an application, the first item of content is referenced and the stored differences of the second item of content are applied.

Preconfigured application content packages, in some embodiments, may include a set of application configuration settings. In other embodiments, a preconfigured application content package includes additional application capabilities. A preconfigured application content package also may include a transformation schema to transform configuration settings of one application layer to another application layer, such as a transformation schema to transform the configuration settings of a platform layer to an application layer or from the application layer to a partner layer.

A transformation schema may be used for many purposes. One such purpose includes simplifying configuration of an application. For example, a typical enterprise resource planning ("ERP") application includes a platform layer and an application layer. The platform layer may include thousands of configuration settings and each configuration setting may have several possible settings. However, the application layer, which may be utilized to configure the application, may only require a subset of the configuration settings of the platform layer. The application layer may require only a subset of the platform application configuration settings because only a portion of the ERP application functionality capabilities are being utilized. In such an instance, configuration settings of the platform layer may be hidden, using a transformation schema, from the application layer. This removes the need to consider how to handle irrelevant configuration settings. In some such embodiments, the transformation schema can also be used to consolidate configuration settings of the platform layer on the application layer. This may be useful when a first configuration setting dictates what a second configuration must be set to. In this instance, the second configuration setting can be consolidated into the first configuration setting and the transformation schema can cause automatic setting of the second configuration setting as a function of the first configuration setting. Thus, a transformation schema, such as a transformation schema that is part of a preconfigured application content package, may be utilized to simplify application configuration.

FIG. 2B is a block diagram of a system 210 according to an example embodiment. The system 210 includes a portable computing device 232 including a configuration application 236, an application configuration dataset 234 stored in a memory, an application transaction dataset 238 and the configuration scoping application 202. The system 210 further includes the application configuration environment 102. Although the application configuration environment 102 is not illustrated within the portable computing device 232, in some embodiments, the application configuration environment 102 does reside within the portable computing device 232. In other embodiments, the application configuration environment 102, the configuration scoping application 202, the application configuration dataset 234, the configuration application 236, and the application transaction dataset 238 all reside on a computing device other than the portable computing device 232.

The configuration application 236, in some embodiments, provides a set of tools via user interfaces to a user. The tools of the configuration application 236 allow the user to modify answers to scoping question answers stored in an input cache 220 of the configuration scoping application 202, the application configuration dataset 234, and the application transaction dataset 238. The application configuration dataset 234 is populated with data copied from a configuration repository 242 stored within a configuration workspace 228 of the application configuration environment 102. The application transaction dataset 238 is populated with data copied either from a demonstration dataset stored in data repository 244 of the configuration workspace 228 or from the content repository 222.

Although the input cache 220 is illustrated within the configuration scoping application 202, the input cache 220 may exist separate from the configuration scoping application 202 within a memory of the portable computing device 232. In such embodiments, the input cache 220 is populated with data copied from the scoping input database 226.

For the sake of understandability regarding several portions of the configuration scoping application 202 and the application configuration environment 102, these portions of the system 210 will be discussed followed by a more detailed discussion of the configuration application 236.

The configuration scoping application 202, in some embodiments, includes a deduction engine 212 and an adaptation catalog 214'. In this embodiment, the configuration scoping application 202 further includes a solution proposal and estimate engine 216, a data migration planner 218, and the input cache 220.

The application configuration environment 102, in some embodiments, includes an adaptation catalog 214, a content repository 222, and a configuration package repository 224. In some such embodiments, the application configuration environment 102 further includes a scoping input database 226, a configuration workspace 118, a deployment module 230, a deployment datastore 240, and a transformation engine 241.

The adaptation catalog 214 includes a representation of all of the solution capabilities of an application to be configured, and eventually executed. Typically, each capability of an application to be configured is identified in an adaptation catalog 214 entry. The adaptation catalog 214 entries typically are each identified as an area, package, topic, or option and are organized in a hierarchy with a child identifying the parent. An example hierarchy may include a "General Ledger" capability, which in some embodiments is a package having two topics, "cash based" and "accrual based" which are two typical application capabilities within the "General Ledger" capability.

The adaptation catalog 214 entries further include scoping questions directed toward obtaining scoping information to determine what areas, packages, topics, and options are relevant to the user's needs, or those of an organization the user represents. Additionally, the adaptation catalog entries include rules, the application of which may require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed by the deployment module 230.

In some embodiments, rules and entries in the adaptation catalog may be linked to a configuration package that exists in the configuration package repository 224. A configuration package includes one or more configuration settings that enable or disable functionality of the application when deployed by the deployment module 230 or by a configuration process within the application configuration environment 102 when configuring the application within the configuration workspace 228. A configuration package may further be linked to one or more content items or content item definitions stored in the content repository 222. Some such content types include report layouts, forms, user interfaces, communication specifications, documentation, and other content that may be used in an application when deployed. A communication specification may include an XML schema, an EDI schema and connectivity information, mappings between file layouts and application data storage mechanisms, such as databases, and other similar communication specifications.

The rules of adaptation catalog 214 entries are also used by the deduction engine 212 of the configuration scoping application 202. The configuration scoping application 202 presents a user interface to a user that requests answers to questions. The questions to be asked via the user interface are identified by the deduction engine 212 based on the adaptation catalog 214'. The adaptation catalog 214' is a copy of the adaptation catalog 214 of the application configuration environment 102. When an answer is received by the configuration scoping application 202 through the user interface, the answer is stored in the input cache 220 of the configuration scoping application 202. The deduction engine 212 then applies the rule associated with the adaptation catalog 214' entry of the question asked to the received answer. Through the application of the rule, in view of answers already received and rules already applied, the deduction engine 212 identifies a next question to ask. The identified question is then presented to the user through the user interface. This process continues until either all of the questions have been asked or the user is out of time, or otherwise chooses to stop. If questions remain that have not been answered, the process may be continued at a later time or rules specifying default areas, packages, topics, and options supply enough information to allow deployment of the application in a functional form.

In some embodiments, a configuration package, and other content, may be developed by one or more of a third-party software developer, an organization utilizing the application, or the original developer of the application. Configuration packages may be developed and distributed as add-ons to the application. Some such configuration package add-ons provide preconfigured application configuration packages. A preconfigured application configuration package includes configuration settings and other content that may provide additional capabilities within the application.

In some embodiments, configuration packages and other content may be stored within a layer of the application. The application in such embodiments includes two or more layers. The layers, in some embodiments, may include two or more of a platform layer, an application layer, a partner layer, a customer layer, and any other layers, depending on the embodiment. In such embodiments, the platform layer includes platform-level configuration settings and content. A platform, in these embodiments, is a low-level portion of the application that provides services and functionality to other layers of the application. Further, the application layer includes application-level configuration settings and content that may be distributed and deployed with the application.

The partner layer, in such embodiments, includes configuration settings and content that may be developed and distributed by a third-party software developer and deployed to an application instance by an organization utilizing the application. The customer layer, in such embodiments, includes configuration settings and content that may be developed and deployed by the organization utilizing the application.

In some embodiments including a multilayer application architecture, each layer may include configuration settings and content. In such embodiments, the configuration settings of one level may be related to the configuration of one or more other layers. However, the configuration settings that may be modified at one level do not need to be the same configuration settings of another level. Such embodiments can include a further layer that may be referred to as a transformation layer.

In some embodiments, the application configuration environment 102 may include a transformation engine 241 that transforms configuration settings of a first layer to the configuration settings of a second layer. For example, the transformation engine 241 may operate to transform the configuration settings of the partner layer to the configuration settings of the application layer. In such embodiments, the transformation engine 241 may transform configuration settings between the various levels according to transformation schemas associated with each level. For example, the transformation engine 241 may transform configuration settings of the partner layer according to a transformation schema of the partner layer. In this embodiment, the transformation schema of the partner layer provides a set of rules and mappings to transform the configuration settings of the partner layer to configuration settings of the application layer.

In some further embodiments including a multi-layer application architecture, other content may be stored in a manner associated with a layer. For example, a user interface may be stored in manner associated with the application layer and another user interface may be stored in a manner associated with the partner layer. In some such embodiments, content stored at one layer can be inherited, or otherwise derived, from content stored at another layer. For example, a user interface stored in the partner layer may be inherited from a user interface stored at the application layer.

In some embodiments where content can be inherited, or otherwise derived, from content that is part of another layer, only the differences between the content items are stored with the second created content item. For example, a communication specification may exist at the application layer. This communication specification may include all of the information necessary to connect to a database, but does not include login credentials necessary to complete the connection. This communication specification may be inherited from and stored another layer, such as a partner layer or customer layer. The partner layer or customer layer instance of the communication specification may further include the login credentials. The instance of the communication specification stored in the partner layer or customer layer may include only a reference to the communication specification stored at the application layer and login credentials. Thus, only a reference to a parent content item and the differences, also referred to as the "delta," between the parent and child content items are stored with the child content item.

In other embodiments, including multi-layered application architecture embodiments and single-layered application architecture embodiments, content may be inherited from and stored within a single layer. For example, a report definition within a single layer may be inherited from and stored within the same layer of the application, such as the application layer. An example embodiment may provide a first user interface that displays data. The first user interface may be inherited from, but be enabled to allow a user to edit the displayed data. In this embodiment, only the delta between the first user interface and the second user interface are stored with the second user interface.

In some embodiments, the configuration scoping application 218 further includes a data migration planner 218. In such embodiments, one or more additional scoping questions may be asked. These additional scoping questions are directed toward obtaining information from the user about legacy systems and how data is stored within them. In some embodiments, the questions simply ask what systems are currently in use. In other embodiments, the questions are more detailed to obtain information such as what type of database an application is utilizing and what type of customization has been made or custom applications developed. The data migration planner 218 uses the answers to these additional questions to propose a data migration plan to the new application.

In some embodiments, the configuration scoping application 202 includes a solution proposal and estimate engine 216. The solution proposal and estimate engine 216 may be used in a sales situation. For example, if a sales person is discussing with a sales lead what a certain application product may do for the sales lead, the sales person may utilize the configuration scoping application 202 to obtain information about the needs of the sales lead via the scoping questions. The scoping question answers and adaptation catalog 214' entries may then utilized by the solution proposal and estimate engine 216 to make an initial determination of what will be involved if the sales lead decides to purchase the application. The solution proposal and estimate engine 216 may output information for the sales lead to make several determinations, such as the size of effort necessary to implement or transition to the application from legacy system and the cost and time involved. In some embodiments, the output of the solution proposal and estimate engine 216 typically outputs one or more of an implementation cost estimate, an application solution proposal, and a recommended project roadmap. In some embodiments, the solution proposal and estimate engine 216 may output a proposal for one or more other options, application descriptions, sales literature, benefit statements of using the application, and addition documents, such as a proposal of key performance indicators the application may monitor to assist in managing the application or enterprise of the sales lead.

After the scoping question have been answered, the answers, and any other information obtained from a sales lead or other user of the configuration scoping application 202, the information may be uploaded to the application configuration environment. However, in embodiments, where the configuration scoping application 202 executes on the same computing device as the application configuration environment 202, the scoping question answers and other information may be stored directly to the appropriate areas of the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information."

After the scoping information is within the scoping input database 226, a process within the application configuration environment 102 may execute to begin configuring an application in the configuration repository 242 of the configuration workspace 228. The configuration repository 242 includes a set of configuration tables that mirrors, at least in part, the configuration tables of the application. The configuration repository 242 may include a set of configuration tables for each of multiple instances of the application. This allows use of the application configuration environment 102 to configure multiple application instances.

The process that configures the application determines one or more configuration packages to instantiate in the configuration repository 242. Configuration packages, in some embodiments, may include one or a set of configuration settings to enable or disable certain capabilities of the application. Configuration packages, as mentioned above, may be linked to adaptation catalog 214 entries and rules associated with adaptation catalog entries. Thus, the process that configures the application in the configuration repository 242 queries the scoping information in the scoping input database 226 to identify configuration packages to instantiate. Further, in embodiments including a multi-layered architecture, the process that configures the application may utilize the transformation engine 241 to set one or more configuration settings based on one or more transformation schemas providing transformation rules and mappings between configuration settings of different levels.

In some embodiments, demonstration data exists to facilitate instantiation of a demonstration instance of the application for a sales lead, training session, or other purpose. The demonstration data, in some embodiments, is linked to one or more configuration packages from the configuration package repository 224. The demonstration data exists in the content repository 222 and may be copied into a set of application tables in the data repository 244 of the configuration workspace 228. These tables may hold such data as transactional data, operational data, master data, or other data that may exist in the application when the application is ready for execution or is executed.

Once the demonstration data is copied to the data repository 244, that data may be fine-tuned to more closely match the intended use of the demonstration data. For example, a sales person, or other individual, may fine-tune demonstration data values to more closely match a sales lead's expectations of the application. This may include modifying sales order documents in the demonstration data to include a name, address, and logo of the sales lead's enterprise, or other similar modifications to the demonstration data.

Some embodiments of the application configuration environment 102 further include the deployment datastore 240. The deployment datastore 240 stores a representation of one or more application configurations of applications that have been deployed. The representations of the one or more application configuration are stored or updated in the deployment datastore 240 by the deployment module 230 upon successful deployment of an application.

A representation of an application configuration includes data representative of the application configuration settings. In some embodiments, the representation further includes data representative of content deployed to the application. In some such instances, the representation may include a representation of deployed configuration packages. Some embodiments may further include a representation of content deployed within each of one or more application layers.

The deployment datastore 240, in some embodiments, is updated upon each configuration or content modification of a deployed system. In some embodiments, the deployment datastore includes a versioning mechanism that maintains not only a current configuration representation, but also historical representations.

In some embodiments, the deployment datastore 240, or a current copy thereof, is maintained by an entity that developed, or otherwise offers for sale, the application. The deployment datastore 240 may be used by the entity to monitor current application usage, perform billing processes as a function of a current application configuration, provide application upgrade information based on portions of the application or content utilized, and for other purposes. In some embodiments, the entity may provide application updates, bug fixes, or other upgrades directly to a deployed application instance. Such updates, bug fixes, or other upgrades may be identified as relevant to a particular application instance as a function of the configuration representation in view of adaptation catalog 214 entries.

As described above, the configuration application 236, in some embodiments, provides a set of tools via user interfaces to a user. The tools of the configuration application 236 allow the user to modify answers to scoping question answers stored in an input cache 220, the application configuration dataset 234, and the application transaction dataset 238. The application configuration dataset 234 is populated with data copied from the configuration repository 242. The application transaction dataset 238 is populated with data copied from either a demonstration dataset stored in the data repository 244 or from the content repository 222. The input cache 220, if separate from the configuration scoping application 202 is populated with scoping information copied from the scoping input database 226.

Through use of the configuration application 236 user interfaces, a user may modify data within the application transaction dataset 238. This allows customization of the data used for a demonstration application to more closely reflect how a sales lead's enterprise will use the application. For example, through modifying the transaction data, data displayed within the demonstration may include orders with products, customers, addresses, countries, and other details that truly reflect those of the sales lead's enterprise.

Further, use of the configuration application 236 user interfaces allows a user to further refine an application configuration to more closely match the needs of a customer or sales lead. This can include a user taking a copy of an application configuration to work on while away from a connection to the application to be configured or application configuration environment 102, such as when traveling.

In some embodiments, the configuration application 236 further includes a warehouse-modeling module. The warehouse-modeling module may include a deduction engine 212 and a subset of an adaptation catalog 214 as discussed above, or leverage the deduction engine 212 and adaptation catalog 214' of the configuration scoping application 202 if present on the portable computing device 232. In such embodiments, the adaptation catalog 214 (or 214') further includes one or more area, package, topic, option hierarchies of adaptation catalog 214 entries. The user may answer scoping questions to identify and define a warehouse layout and processes utilized within a warehouse to be modeled. Such warehouse modeling data, once defined, is copied to the data repository. In some embodiments, such information is similar to configuration settings as a warehouse layout is not subject to frequent change. However, warehouse layouts are generally unique to each warehouse. Thus, warehouse data is stored in the data repository and is deployed to an application data table instead of a configuration table.

FIG. 2C is a block diagram of a system 260 according to an example embodiment. The system 260 includes the application configuration environment 102 as described above with reference to FIG. 1, FIG. 2A, and FIG. 2B. The system 260 further includes the content subscription server 106 as described above with reference to FIG. 1 and FIG. 2A, but provides greater detail with regard to the various elements of the content subscription server according to some embodiments.

The content subscription server may include a content database 246, a database of application instance configurations 248, a database of content subscription preferences, and a content subscription module 252. Some further embodiments also include a copy of the scoping input database 226. Yet further embodiments may include an inbox module providing a location to place new content for download by an administrator or process of an application configuration environment 102.

The content subscription server 106 may be operatively coupled to the application configuration environment 102. In some embodiments, the coupling of the content subscription server 106 to the application configuration environment is over a network connection 254 between the computing systems upon which they operate. In some embodiments, the network connection 254 is an Internet connection. In other embodiments, the network connection 254 is a connection to one or more of a variety of networks including a local area network ("LAN"), a wide area network ("WAN"), a value added network ("VAN"), a peer-to-peer network ("P2P"), or other suitable network providing data exchange functionality.

The content database 246 is a location to which new content is published. Content published to the content database 246 is content that will be processed by the content subscription module 252 and either pushed to or otherwise made available to one or more application instances via their respective application execution environments. As mentioned above, when content is published, the content includes metadata identifying what portions of an application the content is relevant to or otherwise has an effect upon. In some embodiments, content published to the content database 246 may include one or both of parent content and child content inherited from patent content.

The instance configuration settings database may include data representative of application instance configurations. In some such embodiments, the data representative of the application instance configurations may include data representative of content deployed to the respective application instances.

The content subscription module 252 evaluates the metadata of the content published to the content database. The content subscription module may then query the instance configuration settings database 248 to determine which application instances the new content is relevant to. The new content may then be distributed to the application configuration environments of the identified application instances. The application configuration environment may then deploy the new content.

In embodiments that include a copy of the scoping input database 226, the content subscription module 252 evaluates the scoping information to determine if the published content is relevant to one or more application instances. Depending on the metadata of the published content, this evaluation may identify content relevant to an application instance not identified by the evaluation of the instance configuration settings database 248. This may occur when a new item of content is published that was not included in the representation of the application instance configuration settings. This may also occur when the published content is an item of previously existing content whose metadata has been modified.

In embodiments including the content subscription preferences database 250, when an application instance is instantiated, an application administrator, or other individual, may set up a content subscription. A content subscription typically includes a specification of content subscription preferences that are stored in the content subscription preference database 250. These preferences commonly identify how to handle new content when new content is published to the content database 246.

In some embodiments, the content subscription preferences may specify that new content identified by the content subscription module 252 to be relevant to the application instance be pushed to the application configuration environment 102. In some such embodiments, when new content is pushed to the application configuration environment, a content subscription preference may further specify that the new content be automatically deployed to the application execution environment 104 by the deployment module 230. In other embodiments, the preferences may specify that the pushed content is to be stored in an administrator inbox. In these embodiments, the administrator, or other individual will manually instruct the deployment module 230 to deploy the new content. In some other embodiments, a content subscription preference may specify for the new content to be placed in a new content inbox. The new content inbox may be located on the content subscription server 106 or other server from which the new content may be accessed for download. In such instances, an application instance administrator may receive a message including a new content notice. The administrator may then go to the designated download location and download the content. The content may then be deployed manually or automatically by the deployment module 230.

In some embodiments, the subscription preferences may specify that new content be sent to an application instance administrator on a computer readable medium, such as via an email, on a computer disk, or other suitable medium. In such instances, the new content may be copied from the computer readable medium to the application configuration environment 102 and deployed in due course.

FIG. 2D is a block diagram of a system 262 according to an example embodiment. The system 262 includes the content subscription server 106 as described above with reference to FIG. 1, FIG. 2A, and FIG. 2C. The system 262 further includes the content authoring application 204 as described above with reference to FIG. 2A, but provides greater detail with regard to the various elements of the content authoring application 204 according to some embodiments.

The content authoring application 204 may include a user interface module 264, an adaptation catalog 214", a content repository 222", and a configuration package repository 224". The adaptation catalog 214", the content repository 222", and the configuration package repository 224" are the originating sources of this data described elsewhere herein. Content, include adaptation catalog entries, configuration packages, and other content may be authored, modified, and deleted utilizing one or more user interfaces of the user interface module 264.

When a user creates, modifies, or deletes content utilizing the content authoring application 204, the content is typically stored into or deleted from the adaptation catalog 214", the content repository 222", and the configuration package repository 224". Note that adaptation catalog 214" entries and configuration packages stored in the configuration package repository 224" are both content types. Thus, when content is referred to herein, unless explicitly excluded or otherwise called out, adaptation catalog 214" entries and configuration packages are included.

In some embodiments, the user interfaces of the user interface module 264 may be utilized to create or modify a child content item inherited from a parent content item. In such instances, a user interface is provided to a user to identify a content item to inherit from, the parent content item, and cause the child content item to be instantiated. The same, or another, user interface may then be utilized to modify the child content item and store the child content item in a partner layer, a customer layer, or other layer of the application.

In some embodiments, after the content is stored, the content may be verified via quality control processes of the organization utilizing the content authoring application. The content may then be published the content database 246 of the content subscription server 106. The content subscription server 106 may then operates upon the new content to distribute it. In some embodiments, the content is made part of a baseline application that will be instantiated for new application instances.

FIG. 2E is a block diagram of a system 270 according to an example embodiment. The system 270 includes the content authoring application 204 as described above with reference to FIG. 2A and FIG. 2D. The system 270 further includes the application configuration environment 102 as described above with reference to FIG. 1, FIG. 2A, FIG. 2B, and FIG. 2C.

In some embodiments of the system 270, content may be stored directly to the application configuration environment 102. This storing may include copying one or more of the adaptation catalog 214", content repository 222", and configuration package repository 224" from the content authoring application 204 to the adaptation catalog 214, content repository 222, and configuration package repository 224 of the application configuration environment 102.

Figure 3A:
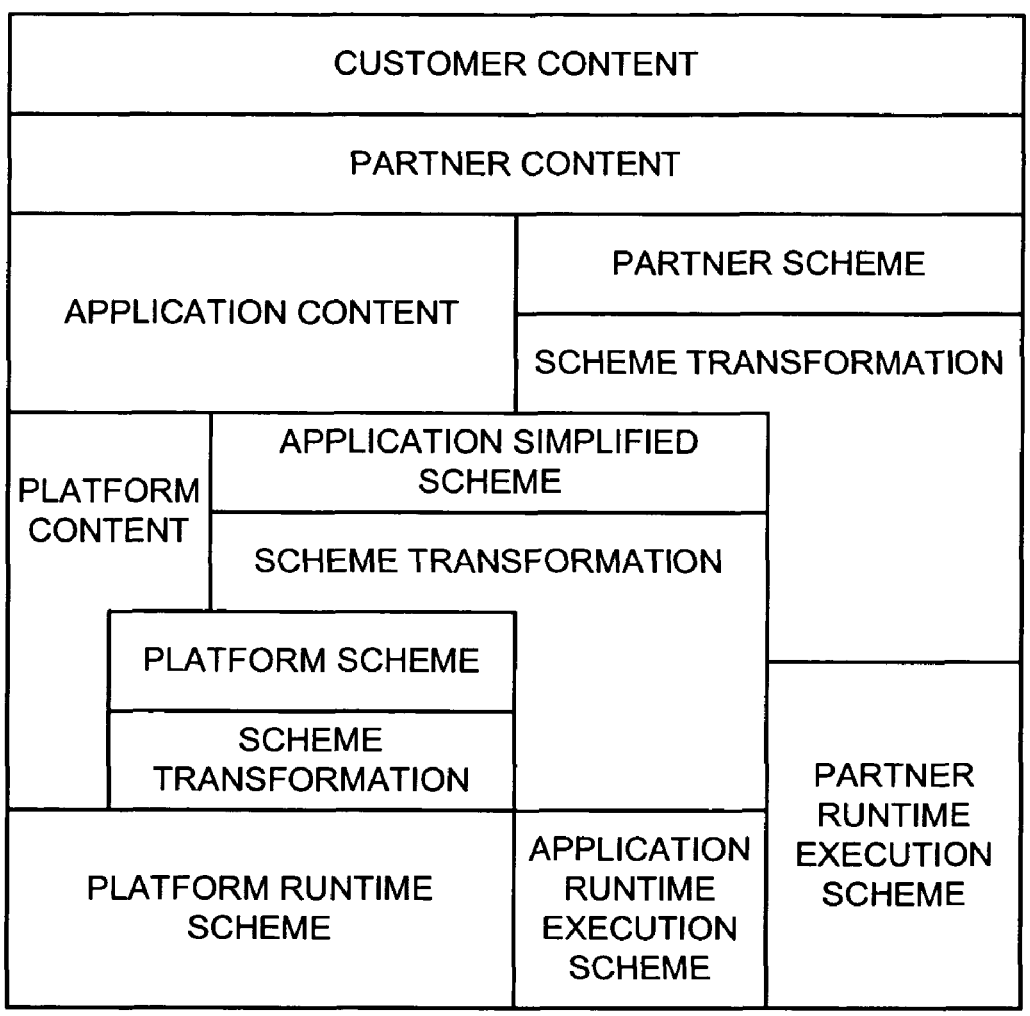
FIG. 3A is a block diagram of a transformation schema according to an example embodiment.

FIG. 3A is a block diagram of a transformation schema according to an example embodiment. The example transformation schema is a transformation schema of a multi-layer application including a platform layer, an application layer, a partner layer, and a customer layer.

Each layer of the application may include a runtime scheme, a layer scheme, and layer content. For example, the platform layer includes a platform runtime scheme and a platform scheme. The application layer includes an application runtime scheme and an application simplified scheme. The partner layer includes a partner runtime scheme and a partner scheme.

A layer runtime scheme, in some embodiments, may include all of possible configuration settings that exist only for that layer. For example, the platform runtime scheme may include only the platform layer configuration settings and the application runtime execution scheme includes only the application configuration settings that exist specifically for the application layer. A layer scheme, in some embodiments, may include all, or a subset, of the configuration settings of the layer. For example, the platform scheme may include only a subset of the platform layer configuration settings.

However, a layer scheme may also include one or more configuration settings of another layer scheme. In some embodiments, the configuration settings of a layer scheme may include a simplified, or otherwise modification of the configuration settings of another layer scheme. For example, the partner scheme may include a first application simplified scheme configuration setting and a single representation of a second and a third application simplified scheme configuration settings.

Each layer may also include a scheme transformation. A scheme transformation may include mappings and rules to transform the configuration settings of a layer scheme to runtime scheme of the layer. For example, the partner scheme includes a scheme transformation to transform the configuration settings of the partner scheme to the partner runtime execution scheme. A scheme transform may also include mappings and rules to transform configuration settings of layer scheme to another layer scheme. For example, the partner scheme transformation may also include mappings and rules to transform configuration setting from the partner scheme to the application simplified scheme.

Returning to the example above that provided the partner scheme may include a first application simplified scheme configuration setting and a single representation of a second and a third application simplified scheme configuration settings. The partner scheme transformation of this example includes a mapping from the first application simplified scheme configuration setting in the partner scheme to the first application simplified scheme configuration setting in the application simplified scheme. The partner transformation of the example further includes a rule to transform the single representation to the second and third application simplified scheme configuration settings. The rule in this embodiment may provide that if the single representation equals a certain value, set the second application simplified scheme configuration setting to true and the third application simplified scheme configuration setting to false, else set both values to null.

FIG. 3B is a block diagram of an application of a transformation schema according to an example embodiment. The example embodiment of FIG. 3B includes a partner layer, an application layer, and a platform layer. The example embodiment further includes partner layer configuration settings in a table, application layer configuration settings in a table, and platform layer configuration settings in two tables. The example embodiment further includes a partner scheme, an application scheme, and scheme transformation mappings and rules between the partner scheme and the application scheme. The example embodiment also includes a platform scheme and scheme transformation mappings and rules between the application scheme and the partner scheme.

The configuration settings in the table K1 of the partner layer include configuration settings A1, A2, A3, and A4. The configuration settings in the table K1 of the application layer include A1, A2, A3, A4, and A5. However, the configuration settings in the table of the partner layer correlate to the configuration settings in the table of the application layer. The correlation of the configuration settings of the configuration settings of the partner layer to the configuration settings in the application layer may be defined in the partner scheme and the application scheme.

In some embodiments, one or both of the partner scheme and application scheme may define the correlation between the configuration settings of the partner layer and the configuration settings of the application layer is defined in the partner scheme. The definition of the correlation between these configuration settings can include mappings of configuration settings between the layers, such as A1=A1, A2=A2, A3=A3, A4=A4, and A5=A2. The definition of the correlation between the configuration settings of the partner layer and the application layer can also include one or more rules. An example rule may provide, if A1, A2, A3, and A4=TRUE, then A5=TRUE.

The configuration settings of the platform layer are split into two tables K1 where the first table includes configuration settings A1, A2, and A3 and the second table includes configuration settings A4 and A5. The application scheme and platform scheme define the correlation between the configuration settings of the application layer and the platform layer. As mentioned above, this can include one or more of configuration settings mappings and configuration setting rules. In this embodiment, the configuration settings of the application layer are actually stored in two tables in the platform layer. This ability to take configuration settings from one layer and make them appear as if they are coming from a single storage location in another layer can be utilized to bring associated configuration settings together in a common location for manipulation, while still storing them in disparate locations. The ability to consolidate such configuration settings into a single location for manipulation may be used to simplify manipulation of configuration settings at another level. However, this is just another example of a rule that may be used to transform configuration settings between layers.

Some embodiments include one or more other rule and mapping types that may be utilized in transformation schemes. In some embodiments, these other rule and mapping types include:

- 1:1 mappings of configuration settings between layers;
- Conditioned 1:1 mappings, such as "IF Application Layer B1=3 then Platform Layer B1=Application Layer B1, ELSE Platform Layer B1=Application Layer B2";
- Merging two or more configuration settings to a single configuration setting;
- Separating one configuration setting into two or more configuration settings;
- Defaulting a configuration setting and hiding the setting to prevent manipulation;
- Hiding one or more configuration settings and conditioning those settings as a function of one or more other configuration settings;
- Restricting a configuration setting to one of a group of possible configuration settings;
- Clustering configuration settings; and
- Other rules and mappings depending on the embodiment.

Returning now to FIG. 3A, when configuring such a multilayered application including transformation schemes, the application may be configured from the top down and deployed from the bottom up. For example, when configuring partner content, modifying a partner level configuration setting causes the configuration setting to cascade down through the application layer via the partner scheme and to the application layer and from the application layer through the application simplified scheme to the platform layer. When deploying the platform configuration settings cascade up in a reverse fashion.

FIG. 4 is a block diagram of a system 400 according to an example embodiment. The system 400 includes the application configuration environment 102 as discussed above with regard to FIG. 1, FIG. 2A, FIG. 2B, FIG. 2C, and FIG. 2E. The system 400 further includes the application execution environment 104.

The application execution environment 104 is a data processing environment within which an application, or an application to be deployed, can execute. The application execution environment includes one or more application instances (i.e., application instances A, B, . . . X) and a transformation engine 241'. The transformation engine 241' in some embodiments, may be the same transformation engine as described above with reference to FIG. 2B, FIG. 2C, and FIG. 2E. The transformation engine 241', although illustrated as separate from the application instances, may be within one or each of the application instances.

When deploying an application, the deployment module 230 needs to know what application execution environment 104 and what application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B, . . . X) includes a set of identical configuration tables, or nearly identical depending on application instance versioning, which can include distinct configuration settings from one another. In some embodiments, multiple instances of the application may exist to provide a development instance, a test instance, and a production instance. In such embodiments where there are multiple application instances, the deployment module 230 may deploy the configuration settings from one of the application instances in the application execution environment 104 to another application in the same or another application execution environment 104. In some embodiments, the deployment module 230, when deploying a multilayered application instance, may utilize the transformation engine 241 or transformation 241' to transform configuration settings between layers. Although the deployment module 230 is illustrated as being a part of the application configuration environment 102, the deployment module 230, in other embodiments, can be a standalone application or a part of another application or process.

Figure 5:
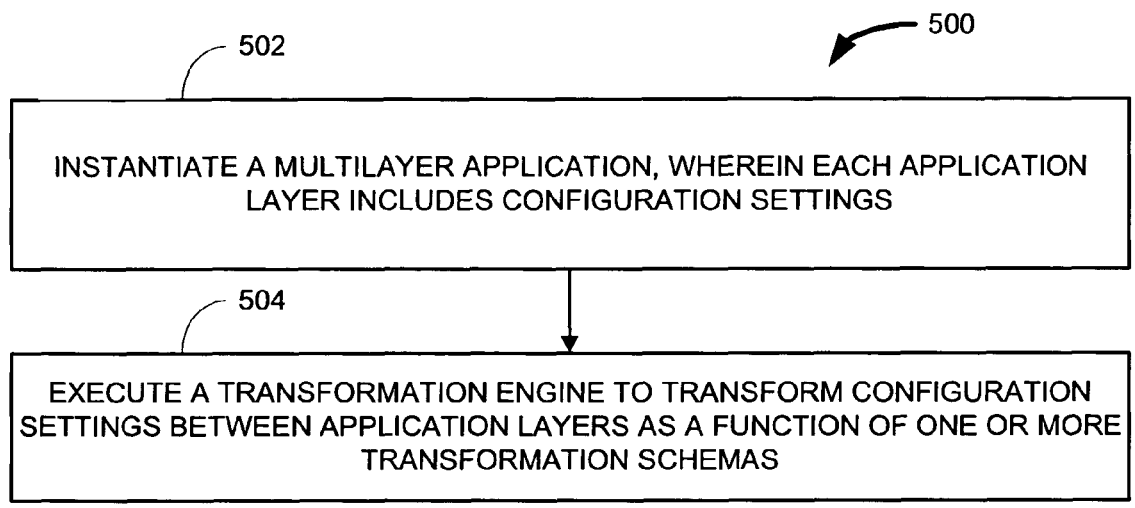
FIG. 5 is a flow diagram of a method according to an example embodiment.

FIG. 5 is a flow diagram of a method 500 according to an example embodiment. The method 500 includes instantiating a multilayer application, wherein each application layer includes configuration settings 502 and executing a transformation engine to transform configuration settings between application layers as a function of one or more transformation schemas 504. In some embodiments, the one or more transformation schemas may include a linking of one or more configuration settings of a first layer to one or more configuration settings of a second layer. In some such embodiments, the linking of one or more configuration settings of the first layer to the one or more configuration settings of the second layer may include one or more of a set of transformation rules and mappings between configuration settings of different layers.

In some embodiments, transformation rules may transform the one or more configuration settings of the first layer to the one or more configuration settings of the second layer. The transformation rules may further transform the one or more configuration settings of the second layer to the one or more configuration settings of the first layer.

Figure 6:
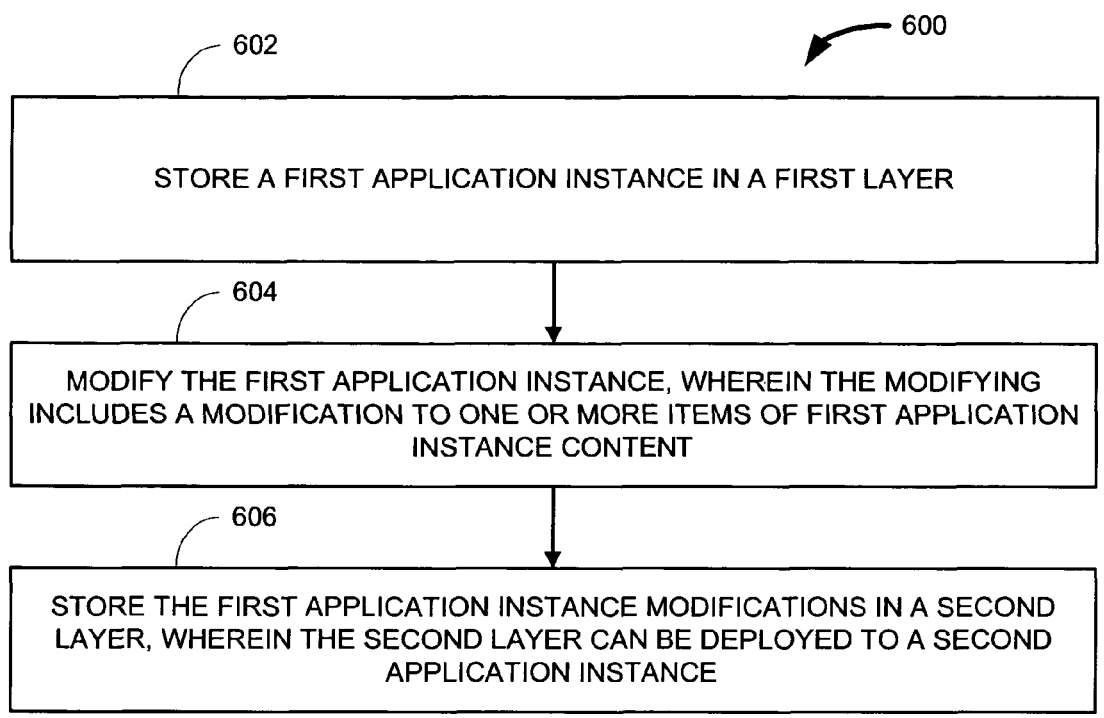
FIG. 6 is a flow diagram of a method according to an example embodiment.

FIG. 6 is a flow diagram of a method 600 according to an example embodiment. The method 600 includes storing a first application instance in a first layer 602 and modifying the first application instance, wherein the modifying includes a modification to one or more items of first application instance content 604. The method 600 may further include storing the first application instance modifications in a second layer, wherein the second layer can be deployed to a second application instance 606. In some embodiments, modifying the first application instance may include adding to the first application instance.

In some embodiments, the first application instance may include one or more preconfigured content packages and modifying the first application instance may include modifying a preconfigured content package. In some further embodiments, a preconfigured content package may include one or more configuration settings and modifying the preconfigured content package may include modifying the one or more configuration settings of the preconfigured content package. In yet further embodiments, modifying the preconfigured content package configuration settings may include adding one or more additional configuration settings to the preconfigured content package.

Figure 7:
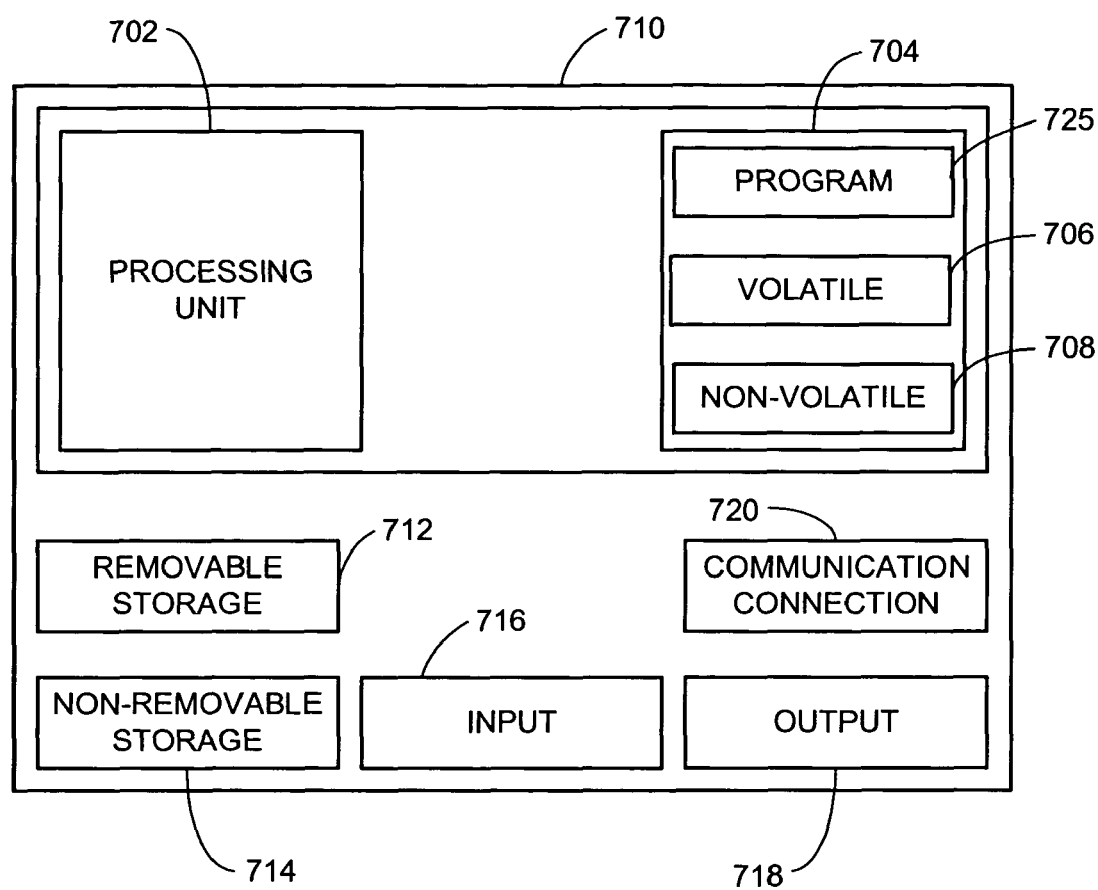
FIG. 7 is a block diagram of a system according to an example embodiment.

FIG. 7 is a block diagram of a computing device according to an example embodiment. In one embodiment, multiple such computer systems are utilized in a distributed network to implement multiple components in a transaction based environment. An object oriented architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage typically includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium. The term "computer readable medium" is also used to represent carrier waves on which the software is transmitted. For example, a computer program 725 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 710 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A system comprising:
   a processor;
   a memory device
   a multilayer application held in the memory device and executable by the processor, wherein each application layer includes configuration settings;
   at least one transformation schema that includes rules to transform configuration settings between application layers and to link at least one configuration setting of a first layer to at least one configuration setting of a second layer according to a set of transformation rules, wherein at least one transformation rule causes the at least one configuration setting of the first layer to be hidden from the at least one configuration setting of the second layer based on the at least one transformation rule conditioning the at least one hidden configuration setting of the first layer on the at least one configuration setting of the second layer; and
   a transformation engine executable by the processor to transform configuration settings between application layers as a function of the at least one transformation schema.

2. The system of claim 1, wherein the application of the transformation rules:
   transforms the at least one configuration setting of the first layer to the at least one configuration setting of the second layer; and
   transforms the at least one configuration setting of the second layer to the at least one configuration setting of the first layer.

3. The system of claim 1, wherein a transformation rule transforms a configuration setting of the first layer to at least two configuration settings of the second layer.

4. The system of claim 1, wherein a transformation rule transforms a configuration setting of the second layer to at least two configuration settings of the first layer.

5. A method comprising:
   instantiating a multilayer application, wherein each application layer includes configuration settings; and
   executing a transformation engine to transform configuration settings between application layers as a function of at least one transformation schema, the at least one transformation schema including a linking of at least one configuration setting of a first layer to at least one configuration setting of a second layer according to a set of transformation rules which, when applied, cause at least one configuration setting of the first layer to be hidden from the at least one configuration setting of the second layer based on at least one transformation rule that conditions the at least one hidden configuration setting of the first layer on the at least one configuration setting of the second layer.

6. The method of claim 5, wherein the application of the transformation rules:
   transforms the at least one configuration setting of the first layer to the one or more at least one configuration setting of the second layer; and
   transforms the at least one configuration setting of the second layer to the at least one configuration setting of the first layer.

7. The method of claim 5, wherein applying a transformation rule transforms a configuration setting of the first layer to at least two configuration settings of the second layer.

8. The method of claim 5, wherein applying a transformation rule transforms a configuration setting of the second layer to at least two configuration settings of the first layer.

9. A non-transient machine-readable storage medium, with stored instructions, which when executed, cause a machine to:
   instantiate a multilayer application, wherein each application layer includes configuration settings; and
   execute a transformation engine to transform configuration settings between application layers as a function of a transformation schema including rules, the transformation schema including a linking of at least one configuration setting of a first layer to at least one configuration setting of a second layer according to a set of transformation rules which, when applied, cause at least one configuration setting of the first layer to be hidden from the at least one configuration setting of the second layer based on at least one transformation rule that conditions the at least one hidden configuration setting of the first layer on the at least one configuration setting of the second layer.

10. The non-transient machine-readable storage medium of claim 9, wherein the application of the transformation rules further causes a machine to:
    transform the at least one configuration setting of the first layer to the at least one configuration setting of the second layer; and
    transform the at least one configuration setting of the second layer to the at least one configuration setting of the first layer.

11. The non-transient machine-readable storage medium of claim 9, wherein a transformation rule transforms a configuration setting of the first layer to at least two configuration settings of the second layer.

* * * * *